Nov. 16, 1954 J. W. FORCE 2,694,413
PROTECTED SEAL FOR FLUID VALVES
Filed May 24, 1951 2 Sheets-Sheet 2

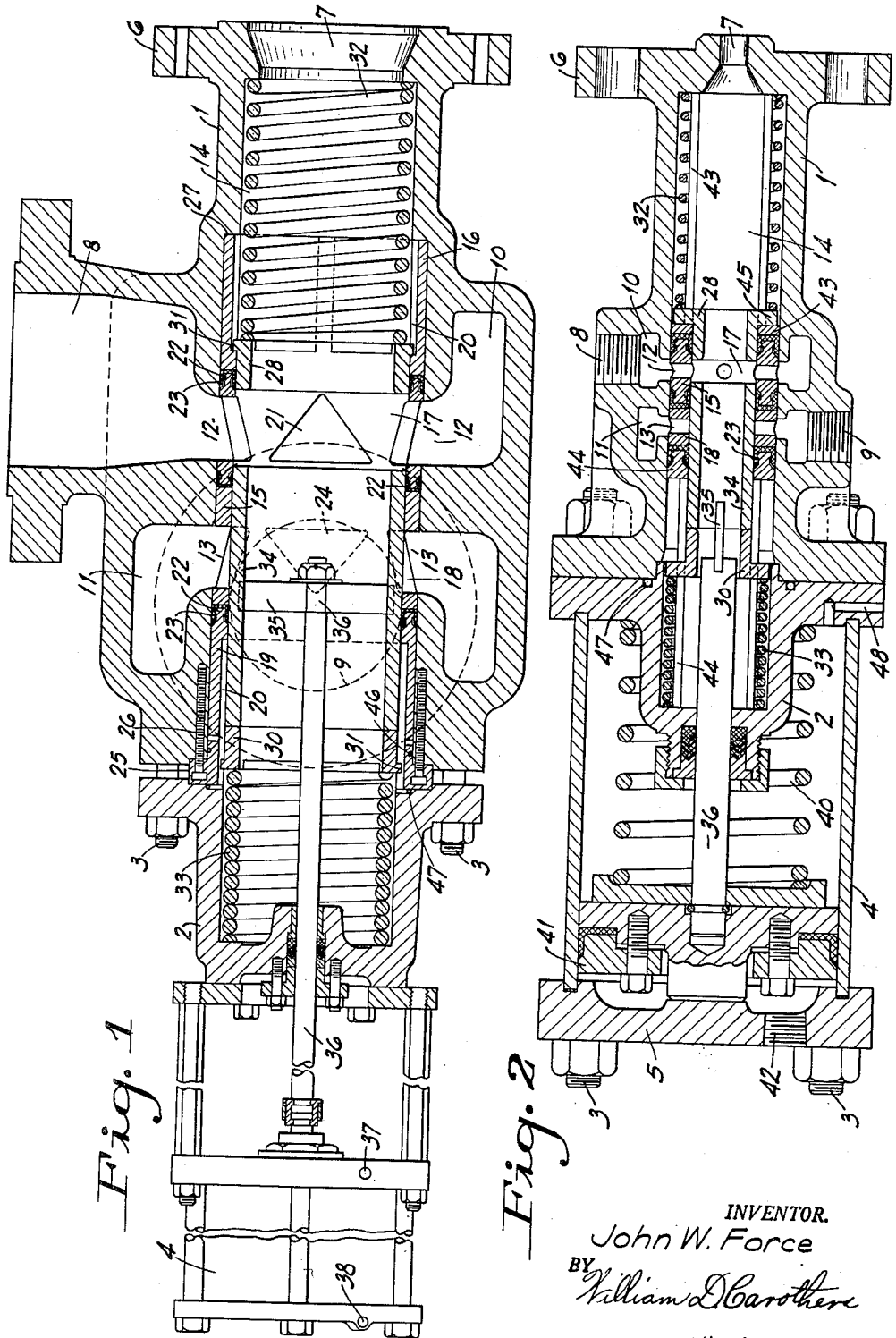

INVENTOR.
John W. Force
BY
William D. Carothers
His Attorney.

United States Patent Office 2,694,413
Patented Nov. 16, 1954

2,694,413

PROTECTED SEAL FOR FLUID VALVES

John W. Force, Osborne, Pa., assignor to Homestead Valve Manufacturing Company, Coraopolis, Pa., a corporation of Pennsylvania Application May 24, 1951, Serial No. 228,000

5 Claims. (Cl. 137—620)

This invention relates generally to valves and more particularly to valves known as plunger or a piston type valve element which moves longitudinally in a chamber and opens or closes lateral ports in the chamber.

Valves of this character are frequently employed to control large volumes of water subjected to high pressure for operating heavy machinery such as shears, presses, blooming mills, manipulators, squeezers, loopers, pushers and other similar heavy duty hydraulically actuated machines that may have single or double acting hydraulic motors.

Many different designs of valves are known in the trade for this use; some of which were three or four-way plug type valves and others were of the leather cup type piston valve. The poppet type valve replaced many of the plunger type valves in the field. However all of these valves have many disadvantages, the principal one being the exposure of the packing or the valve seat to the liquid passing through the valve. The piston type valve eliminates the problem of exposing the valve seat as the valve parts are lateral and do not require the ground or polished seat as does the poppet valve.

The choice of a piston type valve presented other disadvantages. Usually the piston is perforated or has some form of port that mates with a lateral port in the housing. Each structure necessitates the moving of these perforations or ports over the seal on each side of the lateral port in the valve housing which roughs them up and cuts them. The exposure of the seal to the fluid passing through the valve alternately releases the pressure on the seal. When the piston repeatedly releases pressure on and then closes over the seal, the edges of the holes or ports catch and tear the seal so that it no longer holds the fluid under pressure and must be replaced. An attempt has been made to balance the pressure on the seal, but the seal material is still damaged by the edges of the holes or ports in the piston that repeatedly passes over them. Again, dirty river water frequently includes sand, wood chips and other foreign material that erodes the seals.

The principal object of this invention is the provision of a piston type valve structure that maintains the seals covered at all times. This is accomplished by employing pistons with no openings therein and by the use of auxiliary collars that are the same size as the pistons and engage the end of the piston and move over the seal to keep it covered and under mechanical pressure as the piston is drawn off the seal. Thus the seal is never exposed and is subjected to the pressure of the piston or the collar at all times. When there is only one lateral port to seal only one collar is needed. If there are two lateral ports then a collar is used at each end of the piston. If the two lateral ports are to be separately connected to a third port, then the piston can be hollow to permit the flow of fluid therethrough. In such a structure the piston is moved in opposite directions to alternately open either port and the seal on the outer side of the port is covered by its adjacent collar. The collar follows over the seal as the piston leaves it, thus at all times keeping the seal covered and under pressure by either the piston or the collar. With this construction the seal is never directly exposed to the fluid and any particles such as sand, chips and foreign material must be sufficiently small to pass between the piston and the wall of the valve chamber, which is generally tight to be effective in damaging the seal. Anything that can pass the clearance of the valve in the chamber will not harm the seal. The piston and the collars are the same size and fit end to end so that one follows the other over the seal as a single piece.

Other objects and advantages appear hereinafter in the following description and claims.

The accompanying drawings show, for the purpose of exemplification without limiting the invention or claims thereto, certain practical embodiments of the invention wherein:

Fig. 1 is a sectional view of a piston valve having its port sealing sleeve mounted on one section of a partible valve housing.

Fig. 2 is a sectional view of a piston valve having its port sealing sleeve held between the ends of a partible valve housing.

Figure 3:
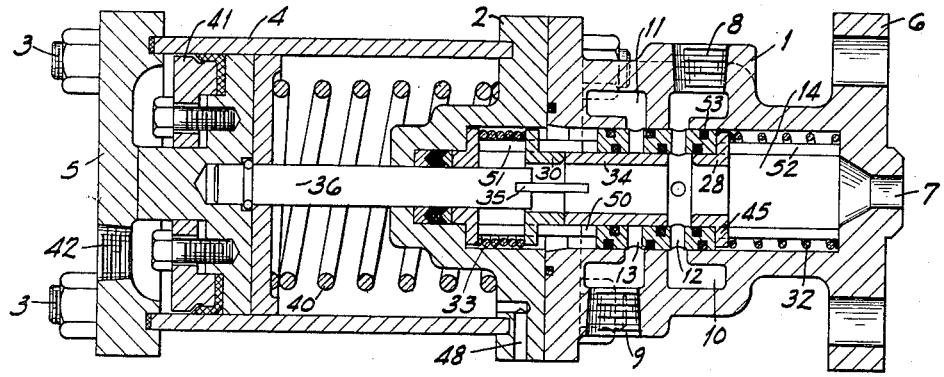
Fig. 3 is a sectional view of a piston valve having its port sealing sleeve constructed as one integral part which is held between the ends of a partible valve housing.

Referring to Fig. 1 of the drawings the valve housing is made in two parts, 1 and 2, which have complementary flanged portions that are bolted together by means of the bolts 3. The heads of the valve-operating cylinder 4 are also bolted in assembled relation. The other end of the valve housing 1 is provided with the head 6 having an annular flange with openings therein for receiving mounting bolts to bolt the same on the end of the cylinder which the piston valve is to control. The center of the housing is provided with the fluid opening 7 which forms a fluid connection supplying operating fluid to a cylinder or other member that is being controlled.

The housing 1 is likewise provided with two lateral ports. The port 8 is the inlet port and port 9 is the outlet port. These connections lead to annular chambers 10 and 11 which in turn are connected to the respective ports 12 and 13 in the housing wall and which open up into the inner valve chamber 14. A sleeve liner 15 is provided in the chamber 14 and is constructed of four independent pieces made up of a series of four independent cylindrical members 16, 17, 18 and 19. The members 16 and 19 are each provided with one or more internal longitudinal grooves 20. The part 17 contains the lateral ports 21 that connect the annular space 10 with the interior of the housing. The ends of the cylindrical portion 17 are reduced to an annular head of T-shaped cross section as indicated at 22 to receive the U-shaped packing members 23. The next consecutive section of the sleeve as shown at 18 has flat ends that engage the bottom of the adjacent U-shaped sealing members 23 and also carry the ports 24 that connect with the ports 13 in the housings. The last section 19 of the sleeve liner is similar to section 16 in that it provides oppositely disposed longitudinal slots 20 but in addition has a lateral extending flange 25 with a series of openings therein for receiving the bolts 26 that bolt the sleeve assembly in position against the shoulder 27 at the opposite end of the chamber. Thus the housing section 1 can carry the complete assembly of the sleeve liner before the other portion or housing section 2 is bolted thereto.

Each of the sleeve sections 16 and 19 has the collar members 28 and 30 slidably mounted therein. These collar members are provided with the radial extending lugs 31 that fit into the longitudinal grooves 20 for the purpose of guiding the collars as their cylindrical portions have a sliding fit inside of the sections 16 and 19 respectively.

A spring 32 is mounted under compression between the end of the housing and the collar 28 to urge the latter toward the center of the valve. A spring 33 is provided in the opposite end of the chamber for urging the collar member 30 toward the center section of the valve. Each cylindrical collar member has a sliding fit in the bore of these end sections and also in the bore of the intermediate sections 17 and 18 which represent the lateral port sections of the liner.

The valve member, as indicated at 34, comprises a cylindrical valve which as shown in Figs. 1 to 4 is a hollow sleeve permitting the fluid controlled by the valve to pass therethrough. This hollow sleeve valve fits the bore of the liner sleeve 15 and is capable of sliding therein. The piston valve member 34 is provided with the cross head 35 that is secured to the piston valve rod 36 for operating the valve member. The valve member 34 is sufficiently long to cover both ports and be in engagement with all of the U-shaped sealing members 23.

The perimetral edge of the ends of the valve 34 and the adjacent perimetral edges of the collars 28 and 30 are sharp and mate with one another so as to simulate a continuous member when in engagement with each other. Thus, when the sleeve is in a central position and closing both ports and also covering the remote U-shaped sealing members 23, the ends of the collars 28 and 30 are in engagement with the ends of the valve and are shoved off the adjacent seal members 23. When the valve rod 36 is moved to open one of the lateral ports, it draws the piston away from one of the collar members and permits the latter to slide over the sealing member and the former to open the adjacent port. However the movement of the valve is limited so that it is impossible for it to expose the intermediate U-shaped seal member 23 as illustrated in the drawings. At this time the opposite collar is moved down the end of the section 19 and the spring 33 is completely compressed as shown on the drawing, whereas the collar member 28 covers the adjacent seal member. The opening 7 is then connected with the inlet 8 and the seals 23 are each covered by the valve and the collar so as to avoid any wear or erosion and to maintain the same protected regardless of the foreign material or character of liquid that is passing through the valve.

When the valve is returned to close the port 21 in the sleeve section 17 then it engages the end of the collar 28 and the two bodies move in unison over the U-shaped sealing member 23 until the valve has completely covered the sealing means 23 and shoved the collar 28 off the same and into the chamber toward the ports 7. If the piston continues in the same direction it will compress the spring 32 in the manner as that indicated by the compressed ring 33 and the collar 30 will follow the piston until it covers its adjacent sealing means 23 and further movement of the piston to the right will cause the ports 24 to be opened and, thus, the discharge 9 will be connected through the hollow piston to the port 7.

The valve rod 36 is operated by a piston within the cylinder 4 which is a double-acting fluid servomotor. The ports 37 and 38 at either end of the cylinder 4 are employed to supply fluid under pressure for moving the control piston back and forth. This double-action servomotor 4 retains the fluid under pressure within the motor to maintain the valve in its proper position and, if the connections 37 and 38 are both discharged, then the springs 32 and 33 are sufficiently strong to cause the valve to center itself and thus close the ports 21 and 24.

The structure as shown in Fig. 2 is quite similar to the structure as shown in Fig. 1 with the exception that the servomotor is single-acting and provides a spring 40 to return the same. The operating piston 41 is supplied with operating fluid through the port 42. In the structure as shown in Fig. 2 the sleeve liner extends the full length of the chamber 14 and the end sections 43 and 44 extend up to and engage the outwardmost sealing means 23 as indicated in the drawing. The intermediate sections are constructed somewhat similar to that as shown in Fig. 1. In this structure the end sections of the sleeve 43 and 44 have a slot extending clear through the wall thereof and the collars 28 and 30 are provided with fingers such as indicated at 45 which extend clear through the slots and are engaged by their respective springs 32 and 33. Thus the bolting together of the housing sections 1 and 2 and the head 5 hold the section parts of the sleeve in assembled relation in the chamber 14. The valve member 34 is likewise a hollow tubular piston, as shown in Fig. 2, and closes the ports 21 and 24 when in a centered position simultaneously covering all of the sealing members 23. In all other respects the valve member of Figs. 1 and 2 are substantially the same. In order to maintain a sealed condition in the valve members as shown in Figs. 1 and 2 the annular flexible sealing rings, such as shown at 46 and 47, maintain the housing sections 1 and 2 in sealed relation when they are bolted together and, as shown in Fig. 2, the operating piston cylinder 4 which encloses the return spring 40 is vented, as indicated at 48, to the atmosphere.

The structure as illustrated in Fig. 3 is similar in principle to the structure of the cylinder in Fig. 2 but requires in addition, a sleeve liner member 50, which in this instance is a single solid piece extending the full length of the valve chamber 14. The single sleeve 50 has slotted ends, as indicated at 51 and 52, for the purpose of permitting the fingers 45 of the collars 28 and 30 to extend therethrough to be engaged by the springs 32 and 33. The sleeve 50 is made in a single integral part owing to the fact that the sealing means in this instance are independent resilient flexible sealing rings of circular cross section, as shown, which may be made of rubber or synthetic rubber or some suitable plastic material. These sealing rings are indicated at 53 and are set in series of annular slots, one on each side of the ports 21 and 24 and one on the inner and the outer surface of the sleeve as shown for the purpose of sealing the ports in the sleeve as well as the ports in the housing. The valve member 34 functions in the same manner to seal and with the collars 28 and 30 maintain the sealing means covered at all times and avoid exposure to the liquid passing through the valve.

Figure 4:
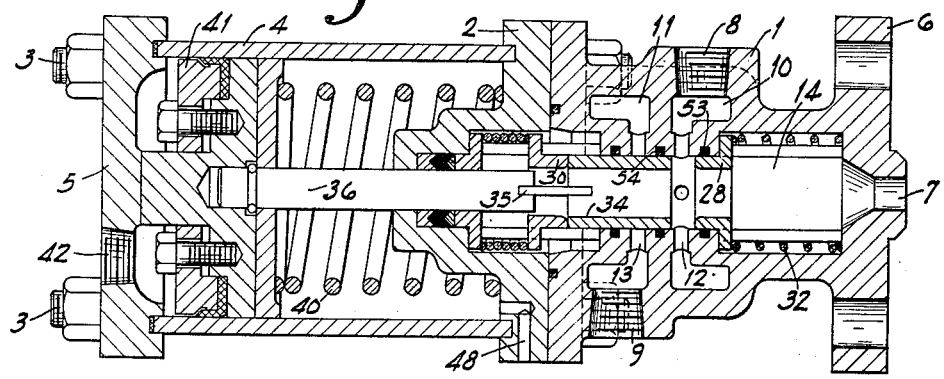
Fig. 4 is a sectional view of a piston valve having no port sealing sleeve.

In the structure as shown in Fig. 4 the sleeve liner has been completely eliminated and the housing is provided with the annular recesses 54 for receiving the annular seal rings 53 as shown. Otherwise the valve as shown in Fig. 4 is substantially the same as that illustrated in Fig. 3.

Figure 5:
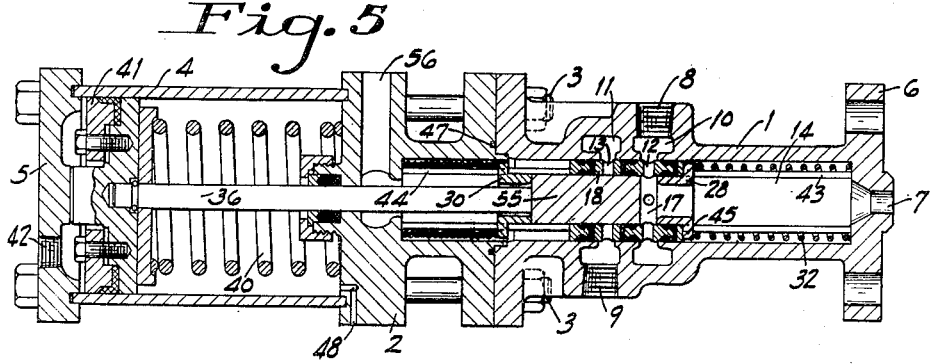
Fig. 5 is a sectional view of a solid piston valve for actuating independent valve ports.

In the structure as shown in Fig. 5 the valve piston 34 has been replaced by a solid piston member 55. Fig. 5 also shows an additional port 56 in the section 2 of the housing. Since the piston 55 is solid and the two ports are provided on each side thereof, the solid piston as shown in Fig. 5 is enabled to control the operation of two independent passageways which need not in any way be connected to each other. The fluid connection 9 may be directly connected with the new port 56 and the connection 8 may be directly connected with the port 7 as previously shown in the housing structure of Figs. 1 and 2. In all other respects the valve structure is the same. It is, of course realized that in structures of this kind we are not dealing with pressures that would be effective in overcoming the fluid pressure of the operating mechanism owing to the fact that a solid piston is employed. However in the instances of the structures, as shown in Figs. 1 to 5 inclusive, the pressures might be very high and are practically ineffective in attempting to move the piston valve one way or the other. The only difference in the pressure area is that of the piston rod itself and this is usually insufficient to control the movement of the piston valve.

I claim:

1. A piston type fluid valve comprising a valve housing having a tubular chamber with fluid connections including one in one end thereof, a pair of lateral ports spaced longitudinally in the wall of said chamber each of which leads to one of said fluid connections, an annular seal means in the cylindrical wall of said chamber on the outer side of each port and between said ports to seal each side of each port, an open sleeve piston fitting said chamber wall and covering all of said annular seal means when closing the lateral ports, an operating rod connected to said piston, a movable collar fitting said chamber wall at each end of said sleeve piston and capable of covering the respective annular seal means on the outer side of each port and making continuous annular contact with the adjacent end of said sleeve piston, said collars and said sleeve piston covering said annular seal means at any position of said valve, spring means to urge each collar toward said sleeve piston, and stop means to arrest further movement of each collar toward said sleeve piston when the sleeve piston is retracted therefrom while the collar covers the adjacent end seal means, said sleeve piston being further retracted to shift the collar to a limited position to uncover one lateral port while the piston covers the seals on both sides of the other lateral port to thereby shield all of said seal means at all times from the fluid flowing through said valve chamber and said sleeve piston when traveling between said fluid connections.

2. The structure of claim 1 which also includes a sleeve liner fitting in said housing and forming the wall of said chamber, lateral ports in said sleeve liner connected with the lateral ports in the housing, said annular seal means sealing each side of said ports independently from each other, and means to hold the sleeve liner in position.

3. The structure of claim 1 which also includes a sleeve liner fitting in said housing and forming the wall of said chamber, lateral ports in said sleeve liner connected with the lateral ports in the housing, said annular seal means sealing the lateral port in the chamber wall, and additional independent annular seal means sealing on each side of said lateral ports between the sleeve liner and the wall of said housing, and means to hold the sleeve liner in position.

4. The structure of claim 1 which also includes a sleeve liner fitting in said housing and forming the wall of said chamber, said sleeve liner comprises a plurality of sections including an intermediate section having a lateral port to connect with a lateral port in the housing, each of said annular seal means sealing the ends of said intermediate section and between the sleeve piston and housing wall, and means to hold the sleeve liner in position.

5. A piston type fluid valve comprising a two-part valve housing having a central bore with an end fluid connection, lateral ports spaced longitudinally in the intermediate portion of the bore of the housing each port having a fluid connection, a sleeve liner means having an intermediate portion fitting said bore and forming a valve chamber, lateral ports in the intermediate portion of the sleeve liner corresponding to the ports in the bore of the housing, annular seal means sealing said ports on both sides, an extension on each end of said sleeve liner means having radial slots extending longitudinally, a piston valve fitting the valve chamber engaging the annular seal means to close said ports and having an operating rod sealed with the housing to move the piston valve, a collar fitting the valve chamber at each end of the piston and capable of making continuous annular contact with the adjacent end of said piston, projections on said collar extending through said slots, a spring engaging each end wall of the housing and the projections of its corresponding collar to urge the latter toward the piston, said projections functioning with the slot end as stop means to arrest further movement of each collar toward said piston when the piston is retracted and the collar covers the adjacent seal means, said piston being further retracted to a limited position to uncover one port without uncovering the seal means on the piston side of the uncovered port and to engage and move the other collar away from the seal means of its port to thereby shield all of said seal means at all times from the fluid flowing through the valve chamber.

References Cited in the file of this patent

UNITED STATES PATENTS

| Number | Name | Date |
|---|---|---|
| 969,803 | Pollock | Sept. 13, 1910 |
| 1,385,019 | Mathiev | July 19, 1921 |
| 1,988,545 | Donn | Jan. 22, 1935 |
| 2,132,030 | Hunt | Oct. 4, 1938 |
| 2,469,921 | Hoge | Mar. 10, 1949 |

FOREIGN PATENTS

| Number | Country | Date |
|---|---|---|
| 21,048 | Great Britain | 1891 |
| 889,480 | France | 1943 |